United States Patent [19]
Konig

[11] 3,733,058
[45] May 15, 1973

[54] DOUGH PORTIONING AND KNEADING MACHINE

[76] Inventor: Helmut Konig, Ursprungweg 70-72, Graz, Austria

[22] Filed: Mar. 8, 1972

[21] Appl. No.: 232,756

[30] Foreign Application Priority Data

Feb. 26, 1971 Austria .................................. A 1698

[52] U.S. Cl. .................................... 259/185, 425/99
[51] Int. Cl. ............................................... A21c 7/06
[58] Field of Search ........................ 259/185; 425/99, 425/100, 101, 98, 97, 96

[56] References Cited

UNITED STATES PATENTS

| 1,960,367 | 5/1934 | Bellingroth | 425/170 |
| 3,543,698 | 12/1970 | Grubelnik | 259/185 |
| 3,547,053 | 12/1970 | Mueller | 259/185 |
| 3,561,372 | 2/1971 | Vogt | 425/100 |

Primary Examiner—Robert W. Jenkins
Attorney—Eric H. Waters et al.

[57] ABSTRACT

A dough portioning and kneading machine has a frame on which a drum is rotably mounted around a horizontally disposed shaft. The drum has pocket openings in its circumference to receive dough supplied from a hopper. The drum is stepwisely rotated and has pistons in each of the pocket openings which are reciprocally moved by a cam means having cam surfaces coacting with the pistons. A kneading tool is arranged above the drum for kneading the dough in the pocket openings during which kneading operation the volume of the pocket openings is increased by means of rotating the cam means relative to the drum.

21 Claims, 11 Drawing Figures

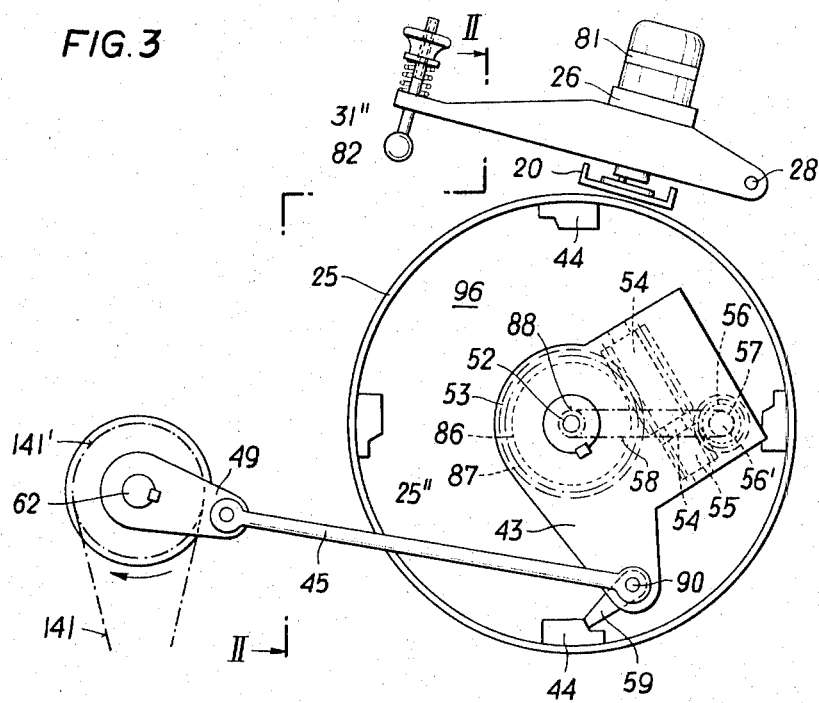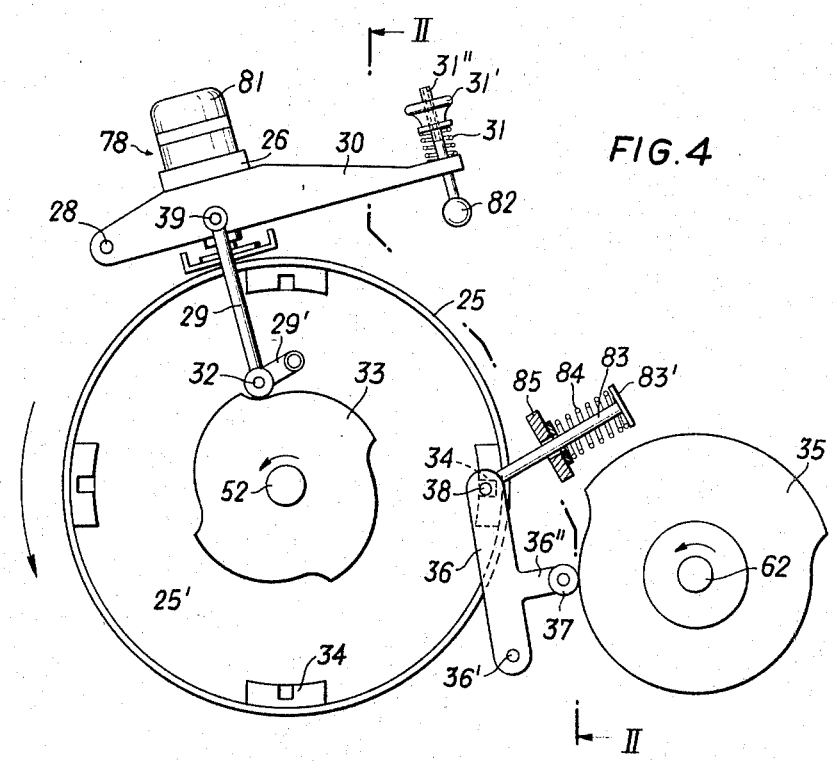

ered by a kneading tool carrier of a kneading device, which kneading tool is driven by a drive means to a movement along a circular path. The kneading device is arranged above the drum which has at least three rows of pocket openings which are disposed in equal distances around the circumference of the drum. When the drum is rotated, the pocket openings pass at first the portioning and supplying station, then the kneading device and then an ejecting station arranged on the descending portion of the path of the drum. The drum has pistons arranged in the pocket openings. These pistons are actuated by a cam means so that the pistons are projected or retracted, respectively, in the pocket openings during the rotational movement of the drum.

DOUGH PORTIONING AND KNEADING MACHINE

This invention relates to a dough portioning and kneading machine. Machines of this kind are known in various types of construction and it is also known to supply the dough at a portioning and supply station by means of a hopper into pocket openings arranged on the circumference of a rotating drum which is journalled in the machine frame. The dough in these pocket openings is kneaded by means of a kneading tool carried by a kneading tool carrier of a kneading device, which kneading tool is driven by a drive means to a movement along a circular path. The kneading device is arranged above the drum which has at least three rows of pocket openings which are disposed in equal distances around the circumference of the drum. When the drum is rotated, the pocket openings pass at first the portioning and supplying station, then the kneading device and then an ejecting station arranged on the descending portion of the path of the drum. The drum has pistons arranged in the pocket openings. These pistons are actuated by a cam means so that the pistons are projected or retracted, respectively, in the pocket openings during the rotational movement of the drum.

Such a construction has been shown by Bellingroth in U.S. Pat. No. 1,960,367 filed Mar. 25, 1931. In this known construction the drum is driven by a drive means to a uniform or constant rotational movement. This has the disadvantage that there is only a short interval of time available for supplying the dough into the pocket openings of the drum. The dough therefore has to be supplied very quickly and this leads to unduly high stresses on the dough. Furthermore there is the disadvantage that the kneading means has to be moved along a circular path in synchronism with the movement of the drum in order to effect the kneading operation. After having continued the kneading operation of the dough pieces situated in one row of pocket openings, the kneading device has to be brought back into its starting position. Within this known construction this is effected by means of springs acting on pivotally arranged arms carrying the kneading device. This has the disadvantage that high stresses occur in the kneading device at the end of the retracting movement and that a very complicated drive means is necessary for driving the kneading tool. Last not least the cam means within this known construction are arranged substantially stationary except one single oscillatably mounted portion of the cam means. By adjusting this portion of the cam means it is possible to vary the volume of the pocket openings of the drum so that the quantity of dough supplied into these openings can be varied. However there is no possibility to vary the volume of these pocket openings when the drum stands still.

It is an object of the invention to overcome these disadvantages in a practical manner. It is a further object of the invention to reduce the constructional effort of the machine. It is a further object of the invention to reduce the stresses acting on the kneading means. It is another object of the invention to reduce the stresses to which the dough is subjected when it is supplied into the pocket openings of the drum. It is another object of the invention to make the machine suitable for variations of the volume of the pocket openings even if the drum is standing still. It is another object of the invention to provide for a construction of the machine suitable for varying the volume of the pocket openings of the drum in accordance with the practical situation given by each step of handling the dough pieces situated within the pocket openings of the drum.

The invention essentially consist in that cam surfaces are provided on at least one cam disc pivotable around the axis of the drum, which cam disc is pivotable by means of a drive means relative to the stepwisely driven drum and relatively to the machine frame and the kneading device during the time intervales between the single steps of the stepwise movement of the drum.

Thus the disadvantages mentioned above are avoided, particularly the disadvantages of the stresses acting on the dough and on the kneading means. Between two subsequent steps of the stepwise movement of the drum the portioning and supplying device has enough time to supply the dough carefully into the pocket openings of the drum. The kneading process is effected when the drum stands still or between the intervals of movement of the drum between two subsequent rotational steps, whereby not only the construction of the drive means for the kneading device is simplified, but also the kneading device can be arranged substantially stationary so that any means for movement of the kneading device along a circular path and any means for retracting it into its starting position are spared. By positioning of the cam surfaces on rotationally arranged cam discs the volume of the pocket openings can be varied even if the drums stands still. By increasing of this volume in the portioning and dough supplying position of these openings the supplying of the dough is facilitated. By an increase of this volume in the kneading position of these openings the kneading process is improved. By the kneading process the dough piece is rounded and brought into a substantially spherical form so that it needs a greater volume of the pocket openings of the drum compared with the volume necessary at the start of the kneading process. Also the ejecting of the dough pieces is improved because it can be effected during the standstill of the drum by means of a rotational movement of the cam disc relative to the drum whereby the pistons in the pocket openings are projected so that the dough pieces are ejected from the pocket openings.

Further objects and advantages of the present invention will become evident from the following description of embodiments of the invention schematically illustrated by way of example in the accompanying drawings in which FIG. 1 shows a vertical section through a first embodiment of the invention.

FIG. 3 is a view seen in the direction of the arrow III of FIG. 2.

FIG. 4 is a view seen in the direction of the arrow IV in FIG. 2.

Figure 1:
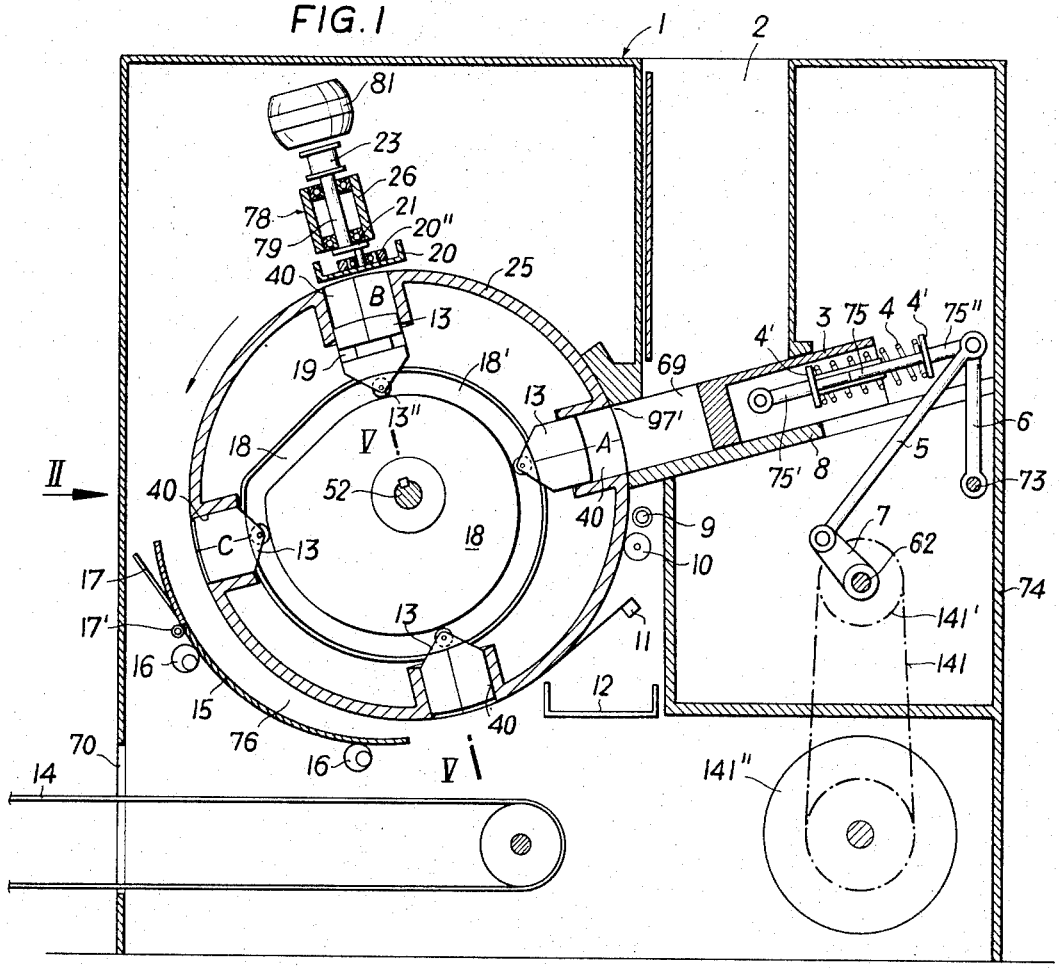

The embodiment of the invention shown in FIGS. 1 through 6 and 9 is positioned within a housing 1 and comprises a hopper 2 formed by a tube. This hopper leads the dough filled in to a storage room 69 for the dough, a dough supplying element 3 being reciprocally guided in said room. This element 3 is driven by means of crank arm 7 and a connecting rod 5 from a main driving shaft 62, said connecting rod 5 being pivotally connected to a rod 75 pivotally connected to the supply element 3. This rod 75 consists of two pieces 75', 75" telescopically guided into each other, each of these pieces being provided with a flange 4'. A spring 4 is so connected to these flanges 4' that the supplying element 3 can be projected and retracted resiliently. The connecting rod 5 is further pivotally connected to a guiding rod 6 pivotally arranged around an axis 73 mounted on the machine frame or on the housing 1. The main driving shaft 62 is driven from a motor 141" by means of a chain 141 and a pinion 141' coacting with the chain 141.

The supplying element 3 is guided in a guide 8 stationary arranged within the housing 1 and serves for supplying dough from the storage room 69 into pocket openings 60 arranged in four rows on the circumference of a drum 25 journalled in shields 41, 42 (FIG. 2) arranged laterally on both sides of the drum 25. Each of the pocket openings 40 preferably has a hexagonal cross section, but may be of any other geometrical configuration if desired. The hexagonal configuration however has shown particularly of advantage for effecting the kneading process. The storage room 69 extends in axial direction of the drum 25 along all pocket openings 40 of a row of the drum. Thus the drum 25 together with the storage room 69 and the supply element 3 builds up a portioning and supplying means wherein the portioning process of the dough is effected in the position A of the pocket openings 40. In the position B of the pocket openings 40 the dough pieces situated in the pocket openings 40 are kneaded and in the position C of the pocket openings 40 the kneaded dough pieces are ejected from the pocket openings 40. These positions A, B, C are spaced from each other in equal distances around the circumference of the drum 25. In the embodiment shown these positions A, B, C are displaced relative to each other at an angle of substantially 90 degrees.

Under "kneading" of the dough pieces a process is to be understood by which by means of a tool moving along a circular path a kneading or moulding effect on the dough pieces is achieved by which the dough pieces are transferred into a ball-like or spherical shape. By this process the surface of the dough pieces is smoothed.

Below the guide means 8 there is provided a perforated tube 9 running along the length of the drum 25 and serving for supplying oil onto a roller 10 contacting the circumference of the drum 25. Below the roller 10 a stripper 11 is provided which resiliently is in contact with the drum 25 and cleans the drum. Dough portions and oil scrapped off the drum fall onto a collecting cup 12.

Below the drum 25 a conveyor band 14 is provided onto which the dough pieces are deposited after being kneaded. The dough pieces may be directly placed from the drum 25 onto the conveyor band 14. For this purpose the conveyor band 14 must be arranged near the position C of the pocket openings 40 (compare FIG. 10). It is also possible however, particularly for the purpose of producing alongated shaped dough pieces, to eject the dough pieces from the pocket openings 40 in position C thereof onto a curved plate 15 whose position may be varied by means of excenters 16. These excenters 16 or their axes are coupled for common movement with each other by means of a chain (not shown) running over pinions fixed onto the shafts of the excenters 16, so that the position of all excenters together can be varied from the outside of the housing 1 by means of an adjusting lever 60 (FIG. 2), whereby the plate 15 can be brought into the desired position relative to the drum 25 according to the desired final diameter of the dough pieces to be produced. The end of the plate 15 situated near the position C of the pocket openings 40 has flaps 17 pivotally mounted around axis 17'. In the lowered position of these flaps 17 they guide the dough pieces ejected from the pocket openings 40 onto the conveyor band 14. The number of flaps 17 corresponds to the number of pocket openings 40 in each row, in the illustrated example thus eight flaps 17 being provided. Each second of these flaps 17 is bent away from the circumference of the drum 25 so that the dough pieces ejected from the pocket openings 40 onto these of the flaps 17 can somewhat precede the other dough pieces, whereby a staggered arrangement of the dough pieces in the gap 76 between drum 25 and plate 15 is achieved. This is of advantage in view of the fact that the width of the gap 76 (seen in direction of movement of the drum 25) decreases somewhat, so that the dough pieces are more and more brought into elongated form as they precede in the gap 76. Without the staggered arrangement of the dough pieces mentioned above there would be the danger that adjacent dough pieces would contact or deform each other. By the staggered arrangement sufficient room is given for each dough piece.

Figure 6:
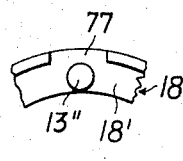
FIG. 6 shows a detail of FIG. 5.
Figure 9:
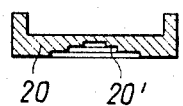
FIG. 9 shows a vertical section through the kneading tool.
Figure 11:
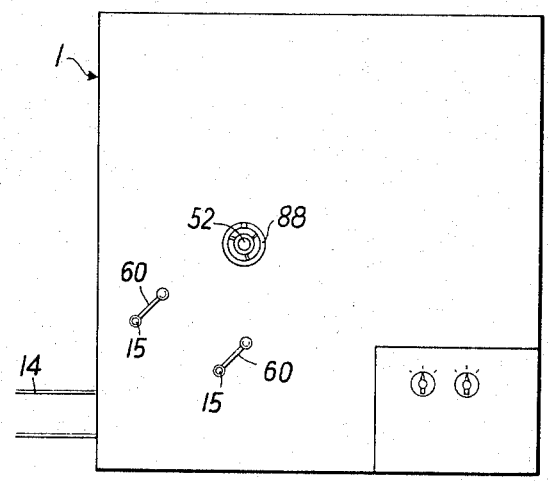
FIG. 11 shows an elevation of the machine shown in FIGS. 1 through 6.
Figure 2:
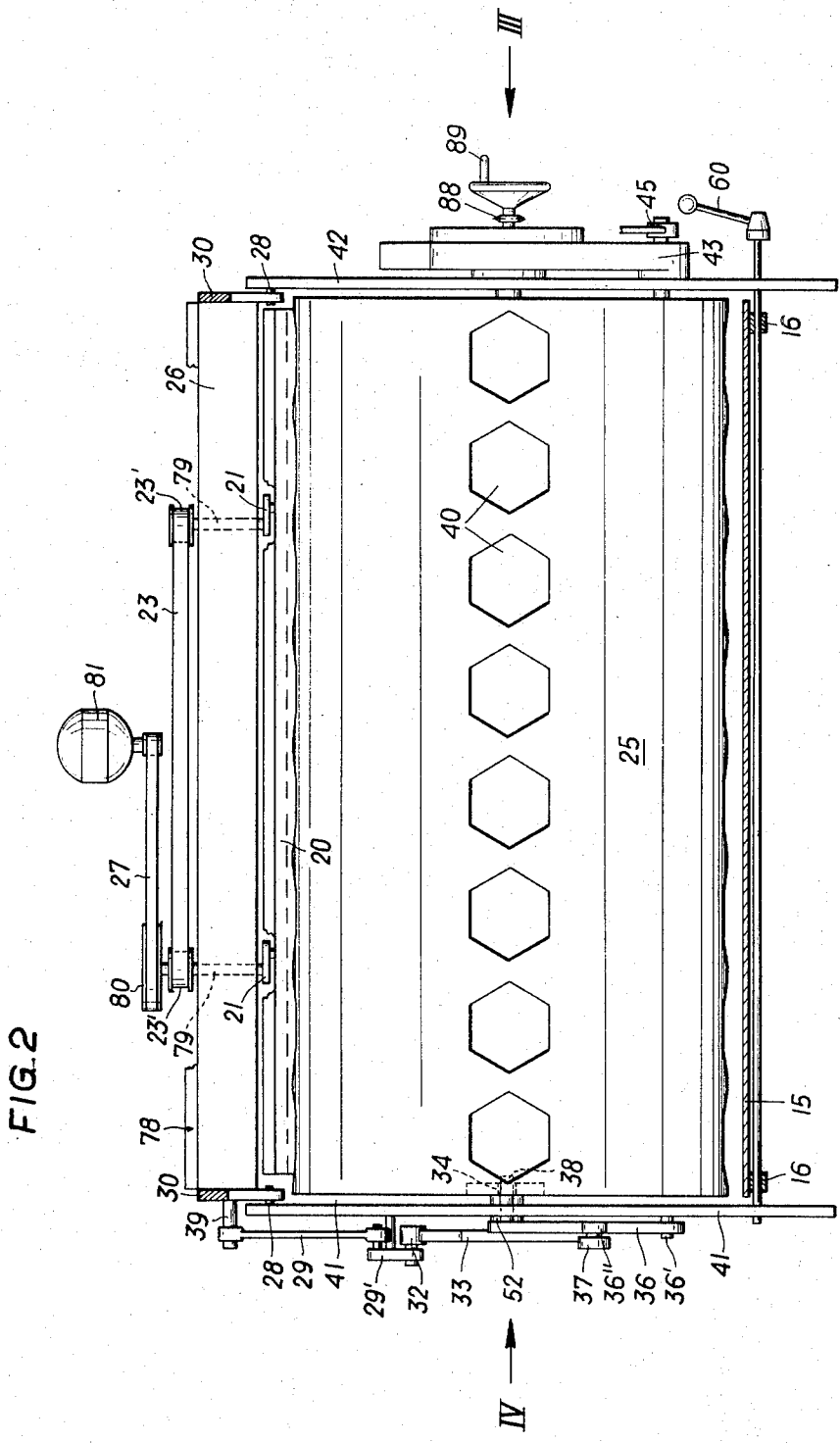
FIG. 2 is an elevation of the drum and the kneading device seen along the line II—II of FIG. 4.
Figure 5:
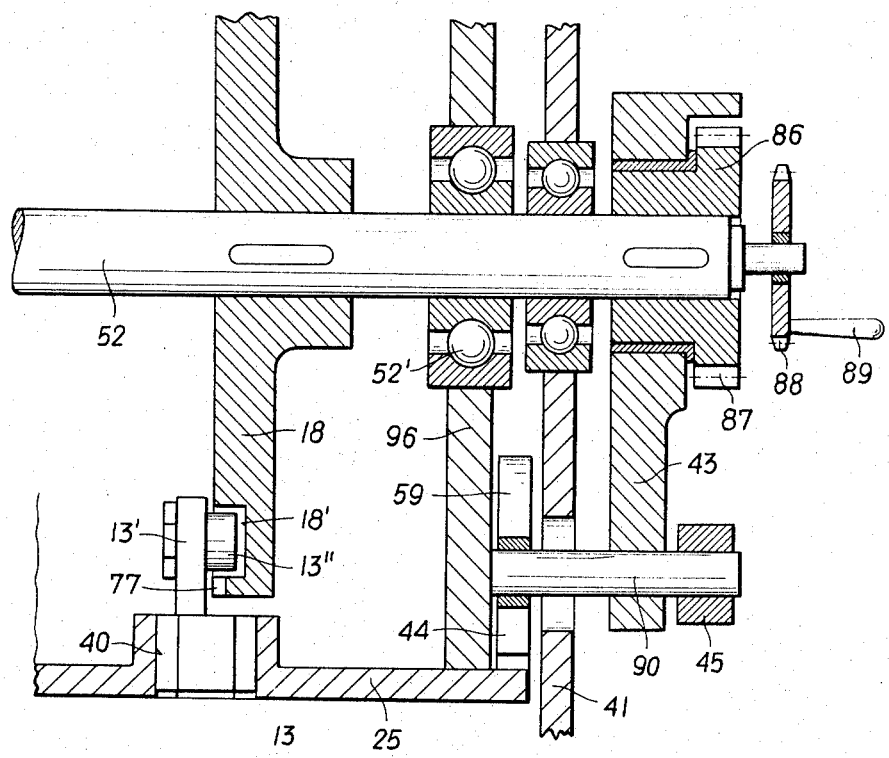
FIG. 5 is a section through the constructional elements serving for journalling the drum and through a cam disc seen along the line V—V of FIG. 1.

In each of the pocket openings 40 a piston 13 having a hexagonal cross section is guided. Each of these pistons 13 has an annular groove 19 on its circumference and is provided with a protusion 13' (FIG. 5) on its inner end bearing a roller 13" pivotally mounted thereon, which roller runs within a groove 18' of a cam disc 18 keyed onto the axis 52 of the drum 25. The walls of this groove 18' form cam surfaces coacting with the roller 13" so that the pistons 13 are projected or retracted in the pocket openings 40 when the roller 13" runs along the groove 18'. For facilitating the assembly or disassembly of the pistons 13, for instance for cleaning purposes, the axis 52 together with the cam disc 18 mounted on it is shiftable in axial direction along a distance corresponding substantially to half the depth of the groove 18', whereby the rollers 13" can be drawn off the groove 18' through recesses 77 in the outer wall of groove 18' (FIG. 6).

In the region of the summit of the drum 25 a kneading device 78 is positioned having a plate 20 which acts as a kneading tool. In the position B of the pocket openings 40 the plate 20 is arranged above these openings and has annular recesses 20' (FIG. 9) above each of these pocket openings 40. The walls of the recesses 20' are stepped according the shape shown in FIG. 9. The plate 20 is mounted on two excenters 21 which are journalled within a kneading tool carrier 26 and being together driven from a motor 81 by means of a vee-belt 27 and vee-belt-disc 80. The vee-belt-disc 80 is keyed onto one of the two driving shafts 79 of the excenters 21 which driving shafts 79 are coupled for rotational movement by means of a toothed belt 23 running over pinions 23' keyed onto the driving shaft 79. Thus the plate 20 is driven for movement along a circular path whereby in a simple manner a most efficient kneading effect on the dough pieces in the pocket openings 40 is achieved. The transmission ratio of the belt gear 27, 80 may be continuously varied by means of any suitable device (not shown) known per se for this purpose, so that the number of revolutions per second of the circular movement of the plate 20 can be adjusted according to the circumstances present. The plate 20 has ball gears 20'' or the like ( FIG. 1) for journalling the excenters 21.

The kneading tool carrier 26, in which the driving shafts 79 are journalled by means of ball bearings, is constituted by a hollow beam having a square cross section. This carrier 26 is fixed on its ends to lateral plates 30 which are pivotally connected by means of trunnions 28 to the shields 41, 42 of the machine frame. The kneading tool carrier 26 is forced against the drum 25 by springs 31 which abut against nuts 31' (FIG. 4) screwed onto bolts 31'' pivotally connected to the shields 41, 42 of the machine frame by means of trunnions 82. A tappet member 29 is pivotally connected to one of the plates 30 and serves for lifting the kneading device 78 during the stepwise movements of the drum 25. For this purpose a cam disc 33 (FIG. 4) is fixed to the one front wall 25' of the drum 25. A roller 32 journalled on the lower end of the tappet member 29 rolls on the circumference of the cam disc 33. This lower end of the tappet member 29 is pivotally connected to the one end of a link 29', the other end of which is pivotally connected to the machine frame. By these means the kneading tool carrier 26 is lifted off the drum 25 against the action of springs 31 during the movement of the drum 25. When the drum stands still, the carrier 26 together with the relatively heavy members (motor 81 etz.) carried by it is lowered onto the dough pieces positioned within the pocket openings 40 so that the kneading process can be effected. During this process the plate 20 presses onto the dough pieces by the weight of motor 81 and the other elements carried by the carrier 26. The springs 31 contribute to the pressure exerted on the dough pieces. The pressure exerted by the springs 31 can be varied by varying the position of the nuts 31' on the bolts 31''.

For securing the drum 25 in the positions corresponding to the kneading action notches 34 are fixed on the front wall 25' of the drum 25. The notches 34 are formed by slotted plates, the number of which is equal to the number of rows of pocket openings 40 on the drum. The securing means 38 formed by a bolt cooperates with one of the notches 34. This bolt is positioned on a lever 36 tiltable around an axis 36' fixed in the machine frame. This lever 36 has a lateral protusion 36'' carrying a roller 37 rolling on the circumference of a cam disc 35 keyed onto the main driving shaft 62. This cam disc 35 is so driven and so shaped that the securing means 38 gets free from the notch 34 whenever the drum 25 has to be rotated over an angle of 90°.

After having completed this drum movement the securing means 38 rests into the next notch 34 . This is secured by a rod 83 linked to the lever 36 so that it presses the roller 37 against the circumference of the cam disc 35. The rod 83 carries on its end a flange 83' against which the one end of a compression spring 84 surrounding the rod 83 abuts, the other end of said spring 84 abutting a flange 85 fixed to the machine frame and having an opening through which the rod 83 passes.

The drum 25 is stepwisely rotated by means of a pawl 59 (FIG. 3) mounted pivotally around an axis 90 and an arm 43 which is mounted pivotally around the axis 52 carrying the cam disc 18. The pawl 59 is connected with a rod 45 linked to a crank arm 49 keyed onto the main driving shaft 62. The pawl 59 cooperates with stops 44 fixed to the front wall 25'' of the drum 25 in a number corresponding to the number of rows of pocket openings 40.

Within the embodiment according to FIGS. 1/6 the crank drive means comprising the crank arm 49 and the rod 45 serves also for a rotation of the cam disc 18 relative to the drum 25. For this purpose the arm 43 is pivotally mounted on the hub 86 (FIG. 3, 5) keyed onto the shaft 52, which hub has a toothed rim 87 being in engagement with a worm 54 mounted for rotation in the arm 43. A pinion 55 is fixed to the shaft 54' of this worm 54, said pinion 55 being in engagement with a further worm 56 mounted for rotation in the arm 43. On the shaft 56' of this worm 56 a pinion 57 is secured which is connected for rotation by means of a chain 58 with a pinion 88 mounted for rotation on the shaft 52 and having a handle 89. By rotation of this handle 89 the pinion 88 is rotated and via the double-worm gear 87, 54 and 54, 55 the hub 86 and therefore the shaft 52 are rotated with respect to the drum 25. Thus the angular relationship of the cam discs 18 relative to the drum 25 can be varied so that depending from the direction of this movement of the cam discs 18 the pistons 13 in the pocket openings 40 are retracted or projected, respectively. Thus it is possible to vary the volume of the pocket openings 40 in order to adapt it on varying dough quantities.

When the forward stroke of the crank drive means consisting of the crank 49 and the rod 45 starts, at the same time the blocking means 38 are retracted from the notch 34 by means of the cam disc 35. The rod 45 brings the pawl 59 into engagement with a stop 44 and rotates the drum 25 together with the cam discs 18 keyed to the shaft 52 in an anti-clockwise sense (seen in FIG. 1). During this movement of the drum 25 the shaft 52 is also rotated in the same sense, because the double-worm-gear on the arm 43 is selflocking so that the shaft 52 is rotated together with the drum 25 whenever the drum 25 is rotated in an anti-clockwise sense seen in FIG. 1. The drum 25 is rotated till the next row of pocket openings 40 is brought under the kneading device 78 and the next row of pocket openings 40 are brought into connection with the storage room 69. When this is done, the locking means 38 snaps into the notch 34 so that a further rotation of the drum 25 is prevented. The drum 25 stands still now and the supplying means 3 is projected by its driving means 5, 6, 7 so that dough from the storage room 69 is forced into the pocket openings 40 being in the position A so that these pocket openings are filled with dough. During the subsequent movement of the crank 49 and the rod 45 towards the drum 25 the pawl 59 slides off the stop 44 which it has engaged up to now. The arm 43 is rotated by the drive constituted by elements 45, 49, so that the shaft 52 and therefore also the cam discs 18 are rotated in a clockwise sense (seen in FIG. 1). During this movement of the cam discs 18 the drum 25 stands still because it is blocked by the blocking means 38. Therefore a relative rotational movement of the cam discs 18 relative to the drum 25 is achieved by which the pistons 13 in the pocket openings 40 are moved. The groove 18' in each cam disc 18 is so formed that in the position C of the pistons 13 these pistons are moved outwardly, preferably to such an extent that their front surface is in flush with the circumferential wall of the drum 25, so that the dough pieces are ejected from the pocket openings 40 and fall onto the endless conveyor band 14 or onto the plate 15 or the flaps 17, respectively. In the position B corresponding to the kneading action the pistons 13 are retracted somewhat towards the shaft 52, so that the volume of the pocket openings 40 is somewhat increased during the kneading process. This corresponds to the fact that during the kneading operation the dough piece is rounded and needs more volume in the corresponding pocket opening 40. In the position A corresponding to the portioning and dough supplying position of the pistons 13 these pistons are also retracted whereby the dough is sucked on from the storage room 69 into the pocket openings 40. This position of the pistons 13 may be varied by means of the gears 54 through 58 and 86 through 88, as described above. If desired, the pinion 88 may be provided with a scale ( not shown) cooperating with a pointer on the hub 86, so that the volume of dough filled in the pocket openings 40 can be read of. Therefore the quantity of dough filled into the pocket openings 40 can be adjusted to a predicted value via the positioning of the pistons 13 in the pocket openings 40 in the position A thereof. As it has already been mentioned, the pistons 13 in the position B of the pocket openings 40 are retracted in same to an extent exceeding the extent occurring in position A of the pocket openings 40.

During the subsequent half-turn of the main driving shaft 62 the drum 25 is rotated over an angle of 90° by means of the rod 45 and the pawl 59 cooperating with the next one of the stops 44. Thus the pocket openings 40 filled with dough are brought from the position A into the position B, during which movement a sharp edge 97' serves for shearing off the dough protuding beyond the outer rim of pocket openings 40. After having continued this rotational movement of the drum 25 a new row of pocket openings 40 lies under the kneading device 78 and the next one of the rows of pocket openings 40 lies in front of the storage room 69 and the cycle starts anew.

During the kneading process and during the retracting movement of the pistons 13 in position B of the pocket openings 40 the drum stands still. Therefore, the dough pieces positioned within these pocket openings 40 can be kneaded when they are standing still. Thus the kneading process is facilitated and improved.

Figure 7:
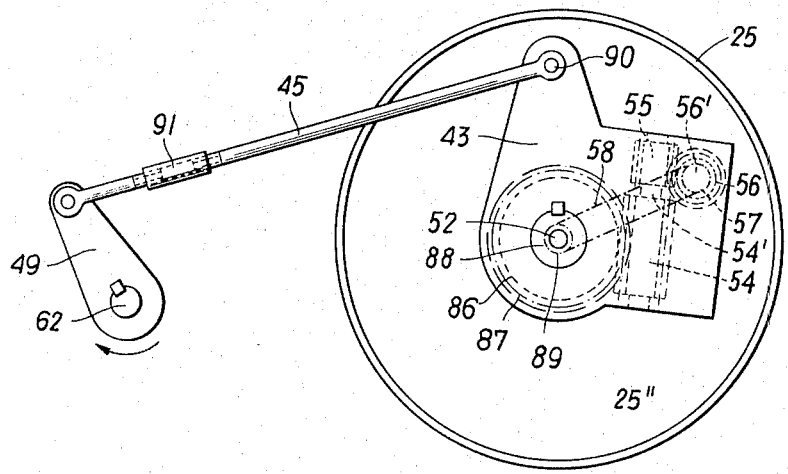
FIG. 7 shows another embodiment of the invention in a view similar to FIG. 3.
Figure 8:
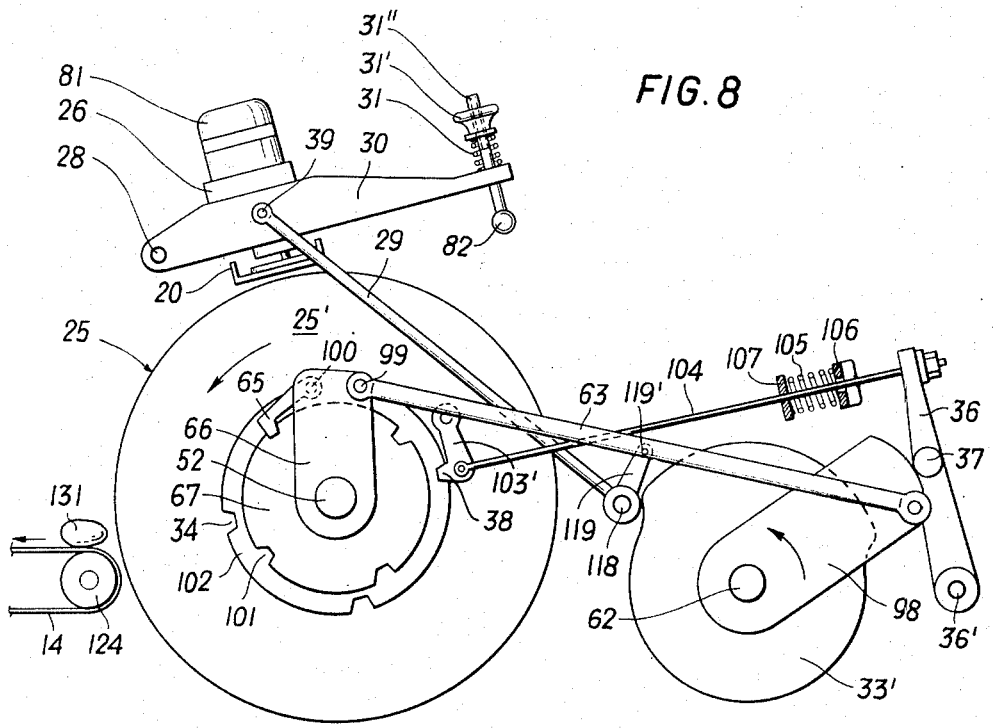
FIG. 8 shows the embodiment of FIG. 7 seen in a view similar to FIG. 4.

The embodiment according to FIGS. 7 and 8 differs from that according to FIGS. 1 through 6 in that according to FIGS. 7 and 8 drive means for the stepwise rotation of the drum 25 and for the oscillating movement of the cam discs 18 are provided, which drive means are seperated from each other and preferably are arranged on opposite sides of the drum 25. On the one front face of the drum 25 the arm 43 (FIG. 7) is arranged which has the same devices for adjusting the volume of dough receiving pocket openings 40 as it has been described with reference to FIGS. 1 through 6. This arm 43 is moved by the rod 45 which is driven in the same manner as it has been shown in FIG. 3. The shaft 52 of the drum 25 on which the drum is journalled for free rotational movement by means of ball bearings 52' (FIG. 5), is oscillatingly rotated over an angle of more than 90 degrees together with the cam discs 18 keyed on it by means of the drive means 45, 49.

On the other front wall 25'' (FIG. 8) of the drum 25 the drive means for the movement of the drum 25 are arranged. These drive means have an arm 98 keyed onto the main driving shaft 62, which arm drives a rod 63 which is pivotally connected by means of a pivot 99 with an arm 66 arranged for free rotational movement on the shaft 52 of the drum 25. A pawl 65 is pivotally connected by a pivot 100 to the arm 66, which pawl 65 cooperates with notches 101 disposed in the circumference of a disc 67 fixed to the wall 25' of the drum 25.

For securing the drum 25 against rotational movement during the intervals of its stepwise rotational movement a disc 102 is provided which has notches 34 on its circumference and is fixed to the wall 25' of the drum 25. These notches 34 cooperate with a blocking means 38 constituted by a latch arranged for angular movement on an axis 103 on the wall 25'. A rod 104 is with its one end linked to this latch 38 and with its other end is fixed to a lever 36 carrying a roller 37 rolling on the circumference of the crank 98. A compression spring 105 is inserted between a stop 106 fixed to the housing or machine frame ( not shown) and a further stop 107 fixed to the rod 104 and serves for pressing the latch 38 towards the shaft 52 so that the latch 38 can snap into the notches 34.

For lifting the kneading tool carrier 26 a cam disc 33' keyed onto the main driving shaft 62 is provided which cooperates with a roller 118 running on the circumference of the cam disc 33' and being carried by a lever 119 pivotable around an axis 119' fixed in the housing 1 or the machine frame. The roller 118 and the lever 119 are pivotably connected to the end of a tappet member 29, the other end of which is pivotably connected to the plate 30 of the kneading tool carrier 26 by means of a trunnion 39.

The embodiment according to FIGS. 7 and 8 has the advantage that the movement of the cam discs 18 can be effected independently from the movement of the drum 25. Thus it is possible that the drive means 45, 49 for the cam discs 18 follow to some extent the movement of the driving means 63, 98 for the drum 25, so that in the position B of the pistons 13 an initial outward movement of the pistons 13 is achieved prior to the start of the movement of the kneading plate 20. Thus the advantage is achieved that by this outward movement of the pistons 13 the dough pieces are brought nearer to the kneading device 78 so that the kneading operation can be effected more efficiently. At the start of the drum movement the cam discs 18 and the drum 25 move substantially in synchronism, but when the drum 25 reaches its blocking position in which its movement is prevented by the blocking means 38, the cam discs 18 continue their rotational movement, whereby the pistons 13 in the pocket openings 40 lying under the kneading plate 20 are moved outwardly to some extent so that they press the dough pieces against the kneading plate 20. Only when the rod 45 is moved to its backward movement the pistons 13 are retracted in the pocket openings 40 to increase the volume thereof in the manner described above.

Figure 10:
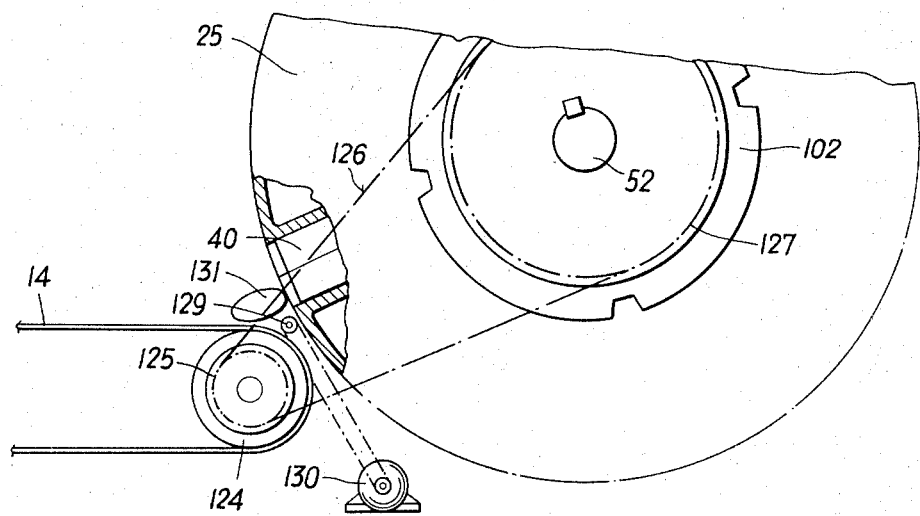
FIG. 10 shows an elevation, partially in section, of a further embodiment of the invention showing modified elements serving for positioning the kneaded dough pieces onto a conveyor band.

FIG. 10 shows an embodiment in which the endless conveyor band 14, which passes through an opening 70 (FIG. 1) of the housing 1, reaches nearly to the circumference of the drum 25. The driving means for the drum may also serve for driving the conveyor band 14. For this purpose the end roller 124 of the conveyor belt 14 may be connected to a pinion 125 which is stepwisely driven by means of a chain 126 from another pinion 127 keyed onto the shaft 52 of the drum 25. Thus the conveyor belt 14 is driven in synchronism with the drum 25.

It is of advantage to dispose a delivering roller 129 at the ejecting station (that is the position C of the pocket openings 40 into which the dough pieces are ejected there-from) in the gap between the circumference of the drum 25 and the conveyor belt 14. This delivering roller 129 may be driven to continuous rotational movement from a motor 130 or may be rotated in synchronism with the rotation of the drum 25, for instance by means of a pinion (not shown) keyed onto the shaft of this roller 129, which pinion is in engagement with the chain 126. By this roller 129 the dough pieces 131 ejected from the pocket openings 40 of the drum 25 are securely guided from the drum 25 onto the conveyor belt 14.

It is further of advantage to rotate the cam discs 18 during the first phase of the kneading operation slowlier than during the last phase thereof. This can be effected by any known means suitable for this purpose, f.i. by a suitable dimensioning of the driving means 45, 49 for the cam discs 18 and 63, 98 for the drum 25, respectively. A very simple construction suitable for this purpose consists in that a high ratio of the effective radius of the arm 49 relative to the length of the rod 45 is chosen so that according to the laws of a crank drive a higher initial acceleration and during the start of the backward stroke of the rod 45 a lower acceleration is achieved, compared with a harmonic movement. By this arrangement the drum 25 together with the cam discs 18 is rotated relatively quick, while the backward movement of the cam discs 18 (that is the movement of the cam discs against the direction of movement of the drum ) starts slowlier so that the volume of the pocket openings 40 at the beginning of the kneading operation is increased at a lower rate than at the end thereof.

Materials suitable for any constructional elements of the inventive machine are well known to one skilled in the art so that they need not to be mentioned.

I claim:

1. A dough portioning and kneading machine, comprising a machine frame, a shaft horizontally journalled in said frame, a drum rotatably mounted on said frame around said shaft, a dough supply station having a hopper to supply the dough to said drum, a plurality of pocket openings arranged in at least three rows on the circumference of said drum to receive the dough from said hopper, pistons reciprocally guided in each of said pocket openings, cam surfaces cooperating with said pistons for moving the pistons in said pocket openings, a kneading station having a kneading device mounted above said drum and having a kneading tool adapted for movement along a circular path for kneading the dough in said pocket openings, a first drive means to effect said movement of said kneading tool, a dough ejecting station situated on the descending part of said rotational movement of said drum, said pocket openings passing one after another said dough supply station, said kneading station and said ejecting station during said movement of said drum, at least one cam means carrying said cam surfaces and being connected for rotation to said shaft, a second drive means for stepwisely rotating said drum and for rotating said cam means around said shaft relatively to said drum during the steps of movement of the drum.

2. A machine as defined in claim 1 wherein said cam means comprises at least one cam disc connected for common rotation to said shaft and carrying said cam surfaces.

3. A machine as defined in claim 1 wherein said cam means is rotated by said second drive means to an oscillating movement so that the cam means are rotated relatively to the drum by which relative rotation of the cam means said pistons in said pocket openings are retracted from the circumference of said drum towards said shaft up to a predetermined extent when said pocket openings are in a position near the dough supply station while when said pocket openings are in a position near said kneading station said pistons are retracted in said pocket openings beyond said predetermined extent.

4. A machine as defined in claim 1 wherein said pistons in said pocket openings are projected up to the circumference of said drum when said pocket openings are in a position near said ejecting station.

5. A machine as defined in claim 1 wherein said drum is driven by said second drive means to a stepwise rotational movement over parts of its circumference corresponding to the distance in which a kneading station is spaced apart from the dough supplying station, measured along the circumference of the drum and wherein the cam disc is rotated at its rotational movement relative to the drum in a sense against the direction of rotational movement of the drum.

6. A machine as defined in claim 1 wherein said second drive means for the stepwise rotational movement of the drum comprises a main driving shaft, a crank arm fixed to said main driving shaft, a pawl moved by said crank arm and stops on said drum, said pawl cooperating with said stops.

7. A machine as defined in claim 1 wherein a locking means is provided for locking the drum during the intervals of its stepwise rotational movement, said locking device comprising notches fixed to said drum and a cam means adapted for rotational movement, said locking device being controlled by said cam means during rotational movement of said drum.

8. A machine as defined in claim 1 wherein said second drive means comprises a main driving shaft, a crank arm carried by said main driving shaft, at least one cam disc carrying said cam surfaces and an arm connected for rotational movement to said shaft, said crank arm acting on said arm.

9. A machine as defined in claim 8 wherein said arm is disposed for angular movement with respect to said shaft, a gear being provided for adjusting the angular position of said arm on said shaft.

10. A machine as defined in claim 9 wherein said gear comprises at least one worm gear and an adjustment wheel positioned on said shaft for adjustment of said arm.

11. A machine as defined in claim 1 wherein said second drive means comprises a main driving shaft, a crank arm fixed to said main driving shaft, a rod linked to said crank arm, said crank arm and rod being adapted for imparting rotational movement to the drum and to the cam means.

12. A machine as defined in claim 11 wherein an arm is connected for rotational movement with said cam means, said rod being pivotally connected to said arm, said second drive means further comprising a pawl and ratchet gear comprising a pawl and a ratchet, said pawl being connected to said rod, and stops fixed to said drum, said stops defining said ratchet.

13. A machine as defined in claim 1 wherein said second drive means comprises a first linkage means operatively connected to said drum and a second linkage means operatively connected to said cam means, said second linkage following in its movement the movement of said first linkage so that on said kneading station said pistons are moved towards the circumference of said drum by said cam means.

14. A machine as defined in claim 1 wherein said kneading tool comprises a plate carried by said kneading tool carrier, recesses in said plate, said recesses having stepped walls.

15. A machine as defined in claim 1, further comprising a lifting means for lifting said kneading tool carrier and said kneading tool off said drum.

16. A machine as defined in claim 15 wherein said lifting means comprises a cam disc and a tappet member, said tappet member cooperating with the circumference of said cam disc and being connected to said kneading tool carrier, said cam disc being connected for rotational movement to said second drive means.

17. A machine as defined in claim 1, said drum having a hollow, said cam means being arranged within said hollow.

18. A machine as defined in claim 1, further comprising a conveyor means disposed near said ejecting station for receiving dough ejected from said pocket openings.

19. A machine as defined in claim 18, further comprising a drive means for said conveyor means, said drive means being connected for rotational movement to said second drive means and being driven in synchronism with the rotational movement of said drum.

20. A machine as defined in claim 18, further comprising a roller, said roller being disposed between said conveyor means and the circumference of said drum, said roller being driven to rotational movement.

21. A machine as defined in claim 1 further comprising a plurality of guiding means disposed near said ejecting station, said guiding means being adjustable in their position relative to said drum, said guiding means guiding the dough ejected from said pocket openings.

* * * * *